(12) United States Patent
Miller et al.

(10) Patent No.: US 9,061,629 B2
(45) Date of Patent: Jun. 23, 2015

(54) APPARATUS AND METHOD FOR AUTOMATICALLY VALIDATING A TRAILER CONNECTION

(71) Applicant: Ford Global Technologies, LLC, Dearborn, MI (US)

(72) Inventors: Thomas Lee Miller, Ann Arbor, MI (US); Scott Alan Watkins, Canton, MI (US); Timothy John Zuraw, Canton, MI (US); Steven M. Sundberg, Canton, MI (US); Conrad Smith, St. Joseph, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 92 days.

(21) Appl. No.: 13/790,417

(22) Filed: Mar. 8, 2013

(65) Prior Publication Data

US 2014/0253307 A1 Sep. 11, 2014

(51) Int. Cl.
*B60Q 1/00* (2006.01)
*B60Q 9/00* (2006.01)

(52) U.S. Cl.
CPC ...................................... *B60Q 9/008* (2013.01)

(58) Field of Classification Search
CPC ....................................................... B60Q 9/008

USPC .............................. 340/431, 435, 903, 932.2
See application file for complete search history.

(56) References Cited

U.S. PATENT DOCUMENTS

| | | | |
|---|---|---|---|
| 6,433,679 B1 * | 8/2002 | Schmid .......................... | 340/435 |
| 6,925,370 B2 * | 8/2005 | Smith et al. .................... | 340/435 |
| 2003/0122659 A1 * | 7/2003 | Lam ............................... | 340/435 |
| 2005/0122234 A1 * | 6/2005 | Danz et al. .................. | 340/932.2 |
| 2008/0024283 A1 * | 1/2008 | Kim ............................... | 340/431 |
| 2008/0218324 A1 * | 9/2008 | Li .................................. | 340/435 |
| 2010/0085172 A1 | 4/2010 | Ancuta | |
| 2010/0271189 A1 | 10/2010 | Miller et al. | |
| 2013/0027195 A1 * | 1/2013 | Van Wiemeersch et al. . | 340/431 |

* cited by examiner

*Primary Examiner* — Thomas Mullen
(74) *Attorney, Agent, or Firm* — Jennifer M. Stec; Brooks Kushman P.C.

(57) ABSTRACT

An apparatus for validating a connection between a vehicle and a trailer is provided. The apparatus comprising a controller configured to detect an object positioned rearward of the vehicle and to receive first information indicative of a first distance between the object and the vehicle. The controller further configured to monitor transmission status of the vehicle in response to the first information and to determine whether the first distance between the object and the vehicle is decreasing in response to transmission status indicating that the vehicle is in reverse. The controller being further configured to determine that the object is a trailer in the event the first distance between the object and the vehicle has not decreased while the vehicle is in reverse.

18 Claims, 2 Drawing Sheets

APPARATUS AND METHOD FOR AUTOMATICALLY VALIDATING A TRAILER CONNECTION

TECHNICAL FIELD

The present disclosure generally relates to an apparatus and method for automatically validating a trailer connection.

BACKGROUND

It is known to detect for the presence of a trailer. One example of detecting the presence of a trailer is set forth in U.S. Publication No. 2010/0085172 ("the '172 publication") to Ancuta.

For example, the '172 publication provides an apparatus and method for detecting the connection of the trailer to a vehicle. The apparatus is connected to a pneumatic pressure line of the trailer's service braking system, and measures the pressure of the system to determine if the trailer is properly connected to the vehicle when the vehicle's engine is running. Further, the apparatus also contains an algorithm that monitors the signals from other vehicle systems, and uses that information to determine the trailer characteristics. The vehicle engine control system receives information from the apparatus and adjusts the various vehicle systems accordingly.

SUMMARY

An apparatus for validating a connection between a vehicle and a trailer is provided. The apparatus comprising a controller configured to detect an object positioned rearward of the vehicle and to receive first information indicative of a first distance between the object and the vehicle. The controller further configured to monitor transmission status of the vehicle in response to the first information and to determine whether the first distance between the object and the vehicle is decreasing in response to the transmission status indicating that the vehicle is in reverse. The controller being further configured to determine that the object is a trailer in the event the first distance between the object and the vehicle has not decreased while the vehicle is in reverse.

A method for validating a connection between a vehicle and a trailer is provided. The method comprises detecting an object positioned rearward of the vehicle and receiving first electronic information indicative of a first distance between the object and the vehicle. The method further comprises monitoring a transmission status of the vehicle in response to the information and determining whether the first distance between the object and the vehicle is decreasing in response to the transmission status indicating that the vehicle is in reverse. The method further comprises determining that the object is a trailer in the event the first distance between the object and the vehicle has not decreased while the vehicle is in reverse.

An apparatus comprising a controller is provided. The controller is configured to detect an object positioned about a vehicle and to receive information indicative of a first distance between the object and the vehicle. The controller is further configured to receive a signal indicative of the vehicle traveling in reverse and to determine whether the first distance is decreasing in response to the signal. The controller is further configured to determine that the object is a trailer if the first distance between the object and the vehicle has not decreased while the vehicle is in reverse.

BRIEF DESCRIPTION OF THE DRAWINGS

The aspects of the present disclosure are pointed out with particularity in the appended claims. However, other features of these aspects will become more apparent and will be best understood by referring to the following detailed description in conjunction with the accompany drawings in which:

DETAILED DESCRIPTION

Figure 1:
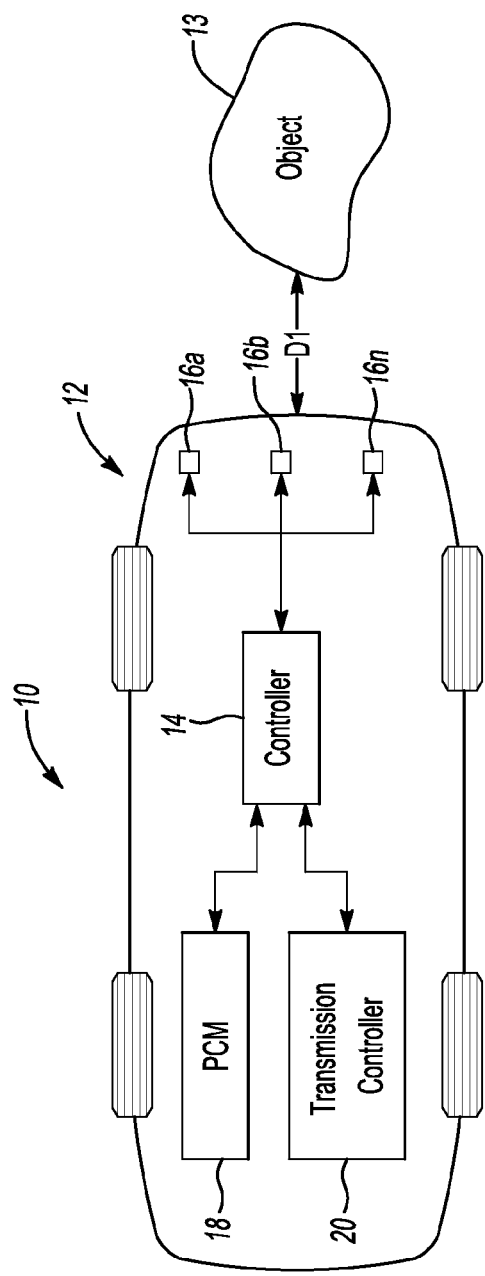
FIGS. 1-2 depict an apparatus for automatically validating a trailer connection for a vehicle in accordance to one aspect.

As required, various aspects are disclosed in detail herein; however, it is to be understood that the disclosed aspects are merely exemplary of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the various aspects.

The present disclosure generally provides for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein.

Vehicles are commonly equipped with reverse park aid (RPA) systems that warn a user when an object is detected to be behind a vehicle. Some vehicle systems may automatically apply brakes to avoid a collision. Further, various vehicle operations such as the Ford MyKey® system may automatically activate the RPA system to ensure that a teen driver, valet driver, or other secondary driver utilizes the RPA system. One example of this implementation is set forth in U.S. Pat. No. 8,306,728 to Miller et al.

An RPA system on a tow vehicle with a trailer is not useful if the presence of the trailer, while attached to the vehicle, triggers continuous false positives. The RPA system may allow the user to temporally the system, however there may be issues in temporarily disabling the RPA system. For example, if the RPA system is disabled, then the user may later forget to re-enable the system and drive with a false sense of security. On the other hand, if the RPA system is designed to automatically re-enable (e.g. between key cycles or park, reverse, neutral, drive, and low (PRNDL) status), then the user may become annoyed and learn to ignore the system.

Some RPA systems may perform a continuity test to detect the light circuit on a trailer and automatically disable the RPA system. The continuity test may be susceptible to circuit failures on the trailer. For example, there may be a faulty bulb or ground connection. The continuity test may also be fooled by a lighted trailer hitch cover (e.g., a lighted trailer hitch cover that emulates lights on a trailer). In other words, drivers who equip their vehicles with a lighted trailer hitch cover may unintentionally disable their RPA system and provide such drivers with a false sense of security. This also offers the secondary driver a way to disable the RPA restriction. Other RPA systems may perform a load test to detect electric brakes on the trailer and automatically disable the RPA system. However, the load test is only effective on trailers that are equipped with electric brakes.

Various aspects of the present disclosure may automatically determine if a trailer is coupled to the vehicle and disable the RPA system in the event such a condition is exhibited. For example, the present disclosure may determine if an object is coupled to the vehicle and determine whether a distance between the object and the vehicle is decreasing as the vehicle proceeds in a reverse direction. In the event the distance between the trailer and the vehicle is found to decrease while the vehicle is traveling in the reverse direction, such a condition may indicate that a trailer is not connected to the vehicle thereby leaving the RPA system active. In addition, the present disclosure may also monitor whether the distance between the vehicle and the object is changing over time or over a small distance as the vehicle moves. If the distance between the object and the vehicle remain the same while the vehicle exceed the number of miles driven, such a condition may then illustrate that a trailer is connected to the vehicle thereby causing the RPS system to be deactivated. These aspects and others will be described in more detail below.

Figure 2:
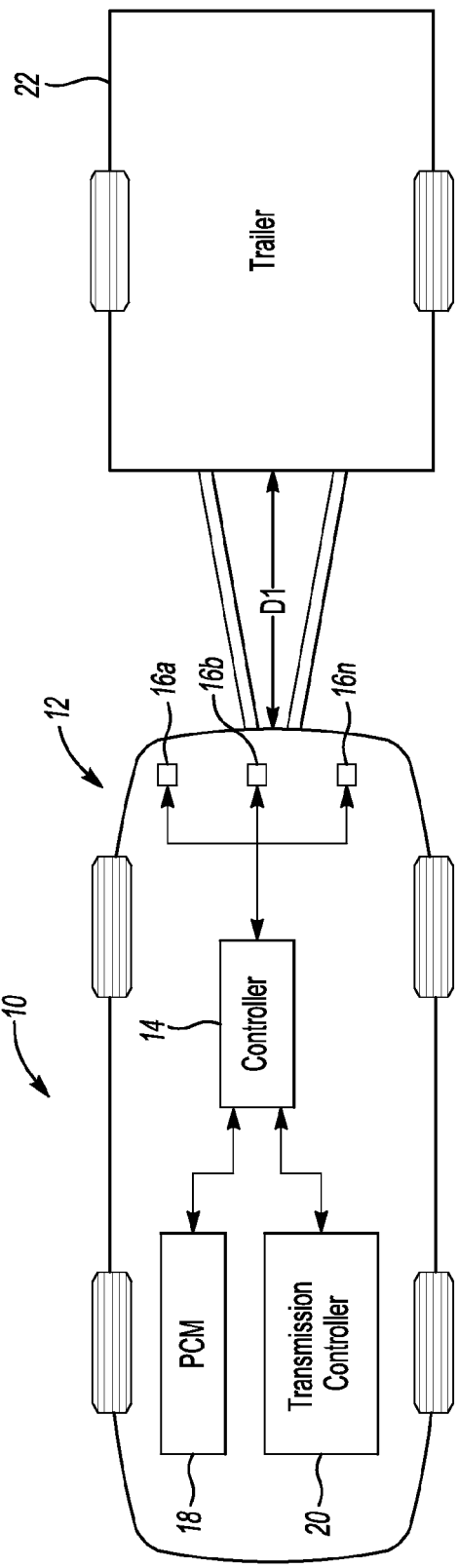

FIGS. 1-2 depict an apparatus 10 for automatically validating a trailer connection for a vehicle 12 in accordance to one aspect. The apparatus includes a reverse park aid/trailer controller (or controller) 14 for activating/deactivating a RPA operation in the vehicle. The RPA operation generally provides an electronic warning to a driver of the vehicle 12 in the event a rear portion of the vehicle 12 comes to close to an object 13 (see FIG. 1). This operation is generally performed while the vehicle 12 is in reverse. The warning indicates to the driver that the vehicle 12 may be too close to an object while the vehicle is in reverse and the warning is triggered at a point in time to allow the driver to stop before contact is made with the object.

A plurality of RPA sensors 16a-16n ("16") is operably coupled to the controller 14. Each sensor 16 may be implemented as an ultrasonic sensor. In this case, each sensor 16 may transmit a high frequency sound wave and evaluate an echo as received back from the object 13 that receives the high frequency sound wave. The sensors 16 may then transmit data indicative of such an echo to the controller 14. The controller 14 then determines the proximity of the object 13 is in relation to the vehicle 12. The controller 14 is capable of determining the distance between the object and the vehicle 12 based on the data provided by the sensors 16. The relevance of this will be discussed in more detail below.

A powertrain control module (PCM) 18 is operably coupled to the controller 14. The PCM 18 is generally configured to provide vehicle speed information to the controller 14. In addition, a transmission controller 20 provides transmission status of the vehicle 12 (e.g., Park, Neutral, Drive, Low, Reverse) to the controller 14. The PCM 18 and the transmission controller 20 may communicate with one another via a data communication bus, such as a high or medium speed controller area network (CAN) bus, a Local Interconnect Network (LIN) bus or other suitable bus generally situated to facilitate data transfer in the vehicle 12. The relevance of the vehicle speed information and the transmission status of the vehicle 12 will be discussed in more detail below.

FIG. 2 depicts the apparatus 10 in which the vehicle 12 is coupled to a trailer 22. As is generally the case, the trailer 22 may be arranged to haul any number of items (e.g., boat, Jet Ski, lawn care machinery, etc.). In some cases, the controller 14 may generate an audible warning in connection with the RPA operation due to the presence of the trailer 22 in relation to the vehicle 12. The vehicle 12 generally includes a user interface (not shown) that will allow the driver the ability to disable the RPA operation while the trailer 22 is connected to the vehicle 12. However, as noted above, in some cases, this feature cannot be disabled for secondary drivers. It may be preferable to allow the apparatus 10 to automatically determine or validate the presence of the trailer 22 for purposes of disabling the RPA operation when the trailer 22 is connected thereto. Such a condition may avoid the condition in which false positives are generated and may also eliminate the need to perform a continuity test of a light circuit of the trailer 22 or detect an electric brake circuit associated with the trailer 22.

Figure 3:
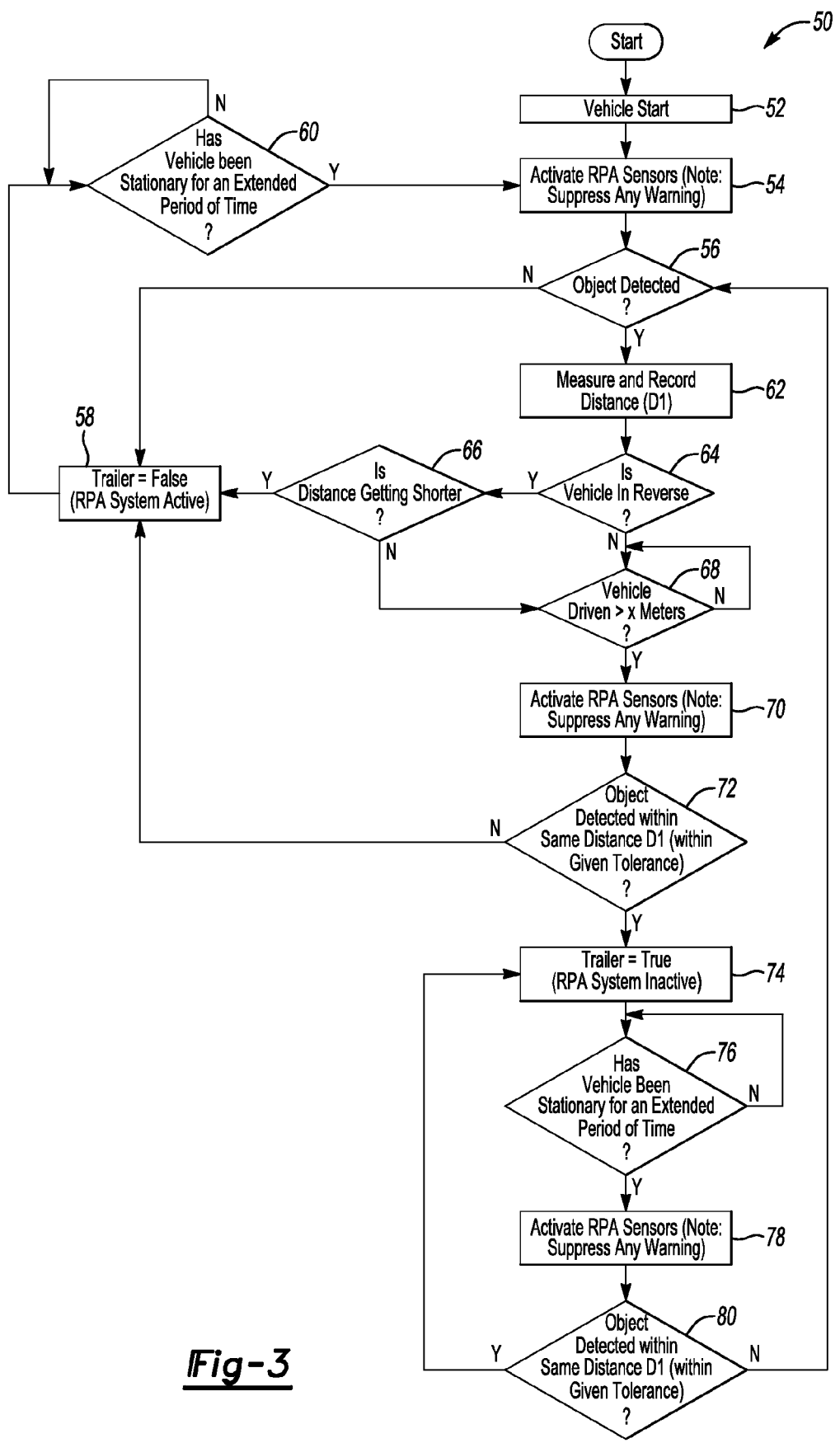
FIG. 3 depicts a method for automatically validating a trailer connection for a vehicle in accordance to one aspect.

FIG. 3 depicts a method 50 for automatically validating a trailer connection for the vehicle 12 in accordance to one aspect.

In operation 52, the controller 14 detects that the vehicle 12 has been started. The PCM 18 or other control module in the vehicle 12 may transmit data indicative of the engine being started.

In operation 54, the controller 14 activates the plurality of RPA sensors 16 to monitor for the presence of the object 13. The controller 14 suppresses warnings at this point in the method 50.

In operation 56, the controller 14 determines whether the object 13 has been detected. If the object 13 has not been detected, then the method 50 moves to operation 58. If so, then the method 50 moves to operation 62.

In operation 58, the controller 14 determines that an object 13 is not detected and hence the trailer 22 is not coupled to the vehicle 12.

In operation 60, the controller 14 determines whether the vehicle 12 has been stationary for a predetermined amount of time. For example, the controller 14 monitors the transmission status as provided from the transmission controller 20 and/or vehicle speed as provided from the PCM 18 to determine if the vehicle has moved within the predetermined amount of time. In the event the vehicle 12 is in a parked state, such a condition is generally indicative of the vehicle 12 being stationary. Further, in the event the vehicle is not exhibiting a vehicle speed, such a condition is generally indicative of the vehicle 12 being stationary. If the vehicle 12 is not stationary within the predetermined amount of time, then the method 50 remains in operation 60. If so, then the method 50 moves back to operation 54. If the vehicle 12 has been stationary in excess of the predetermined amount of time, it is possible that the object 13 may have moved or been placed behind the vehicle 12 and it may be desirable to execute the method 50 again.

In operation 62, the controller 12 receives data from the plurality of RPA sensors 16 to measure and record a first distance (e.g., D1). The first distance corresponds to a distance from behind the vehicle 12 to the object 13 (or trailer 22 if this is detected to be connected as noted in connection with operation 74) from the vehicle 12.

In operation 64, the controller 14 determines whether the vehicle 12 is in reverse. For example, the controller 14 receives the transmission status signal from the transmission controller 20 to determine if the vehicle 12 is in reverse. If the vehicle 12 is in reverse, then the method 50 moves to operation 66. If not, then the vehicle 12 moves to operation 68.

In operation 66, the controller 14 determines whether the first distance between the vehicle 12 and the object 13 is decreasing. For example, the controller 14 monitors data from the plurality of RPA sensors 16 over a small period of time to determine if the distance is decreasing over such a period. If this condition is true, then the method 50 moves to operation 58. Operation 58, in this instance generally indicates that there is an object 13 that is positioned rear of the vehicle 12 however; the object 13 is not a trailer 22. In this case, the object 13 is detected and the controller 14 electronically notifies or alerts (e.g., visual and/or audible) the driver that the object 13 has been detected.

If the controller 14 determines that the distance is not decreasing (or not getting shorter), then the method 50 moves to operation 68.

In operation 68, the controller 14 determines whether the vehicle 12 has traveled greater than a predetermined distance (e.g., meters). For example, the PCM 18 or an instrument cluster (not shown) transmits data indicative of the distance traveled by the vehicle 12. If the vehicle 12 has exceeded the predetermined distance, then the method 50 moves to operation 70. If not, then the method 50 remains in operation 68. Alternatively, the method 50 may move to operation 64. In operation 68, the vehicle 12 will no longer be in reverse and will be in a forward drive mode (e.g., the state of the transmission will be in Drive or Low).

In operation 70, the controller 14 activates the plurality of RPA sensors 16 to monitor for the presence of the object 13. The controller 14 suppresses warnings at this point in the method 50.

In operation 72, the controller 14 receives data indicative of a second distance from the plurality of RPA sensors 16 to determine if the second distance between the vehicle 12 and the object 13 is similar to the first distance (e.g., D1) as obtained in connection with operation 62. If the second distance is similar to the first distance as obtained in connection with operation 62, then the method 50 moves to operation 74 and establishes that the object 13 behind the vehicle 12 is the trailer 22. If not, then the method 50 moves back to operation 58. It is recognized that the operation 72 may be optional and that the controller 14 may suppress the alert for the RPA operation after operation 66 is performed and a determination has been made that the distance is not decreasing after the vehicle is in reverse.

In operation 74, the controller 14 determines that the object 13 is the trailer 22 and suppresses the alert for the RPA operation. Operations 72 and 74 are generally performed to confirm that a trailer is in fact present while the vehicle is moving forward.

In operation 76, the controller 14 determines whether the vehicle 12 has been stationary for the predetermined amount of time. As noted above, the controller 14 monitors the transmission status as provided from the transmission controller 20 and/or vehicle speed as provided from the PCM 18 to determine if the vehicle has moved within the predetermined amount of time. In the event the vehicle 12 is in a parked state, such a condition is generally indicative of the vehicle 12 being stationary. Further, in the event the vehicle is not exhibiting a vehicle speed, such a condition is generally indicative of the vehicle 12 being stationary. If the vehicle 12 has been stationary for a period greater than the predetermined amount of time, it may be desirable to execute operations 78 and 80 to again determine if the vehicle 12 is coupled to the trailer 22 as it is possible that the driver may have disengaged the trailer 22 from the vehicle 12 and that an object 13 may have either moved or been placed behind the vehicle 12.

If the vehicle 12 is not stationary within the predetermined amount of time, then the method 50 remains in operation 76. If so, then the method 50 moves back to operation 54.

In operation 78, the controller 14 activates the plurality of RPA sensors 16 to monitor for the presence of the object 13. The controller 14 suppresses warnings at this point in the method 50.

In operation 80, the controller 14 receives data indicative of a third distance from the plurality of RPA sensors 16 to determine if the third distance between the vehicle 12 and the object 13 is similar to the first distance as obtained in connection with operation 62. If the third distance is similar to the first distance as obtained in connection with operation 62, then the method 50 moves back to operation 74 and determines that the object 13 is the trailer 22. In this case, the controller 14 suppresses the alert for the RPA operation. If not, then the method 50 moves to operation 56.

It is recognized that in operation 80, the controller 14 may optionally compare the third distance to the second distance to determine if the object 13 is the trailer 22. In this case, the second distance is generally similar to the first distance (e.g., operation 72 is true).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An apparatus for validating a connection between a vehicle and a trailer, the apparatus comprising:
    a controller configured to:
        detect an object positioned rearward of the vehicle;
        receive first information indicative of a first distance between the object and the vehicle;
        monitor transmission status of the vehicle in response to the first information;
        determine whether the first distance between the object and the vehicle is decreasing in response to the transmission status indicating that the vehicle is in reverse;
        determine that the object is a trailer in the event the first distance between the object and the vehicle has not decreased while the vehicle is in reverse;
        determine whether the vehicle has traveled above a predetermined distance while the vehicle is in a forward drive mode; and
        receive second information indicative of a second distance between the object and the vehicle.

2. The apparatus of claim 1 wherein the controller is further configured to deactivate alerts in connection with a reverse park aid (RPA) system in response to determining that the first distance between the object and the vehicle has not decreased while the vehicle is in reverse.

3. The apparatus of claim 1 wherein the controller is further configured to deactivate alerts in connection with a reverse park aid (RPA) system in the event the second distance is generally similar to the first distance and the vehicle has traveled above the predetermined distance while the vehicle is in the forward drive mode.

4. The apparatus of claim 3 wherein the controller is further configured to determine whether the vehicle has been stationary for a predetermined amount of time after deactivating the alerts.

5. The apparatus of claim 4 wherein the controller is further configured to receive third information indicative of a third distance between the object and the vehicle after the vehicle has been stationary for the predetermined amount of time.

6. The apparatus of claim 5 wherein the controller is further configured to determine whether the third distance is generally similar to the first distance and to deactivate alerts in connection with the RPA system if the third distance is generally similar to the first distance.

7. The apparatus of claim 1 wherein the controller is further configured to activate alerts in connection with a reverse park aid (RPA) system in response to determining that the first distance between the object and the vehicle has decreased while the vehicle is in reverse.

8. A method for validating a connection between a vehicle and a trailer, the method comprising:
   detecting an object positioned rearward of the vehicle;
   receiving first information indicative of a first distance between the object and the vehicle;
   monitoring a transmission status of the vehicle in response to the first information;
   determining whether the first distance between the object and the vehicle is decreasing in response to the transmission status indicating that the vehicle is in reverse;
   determining that the object is a trailer in the event the first distance between the object and the vehicle has not decreased while the vehicle is in reverse;
   determining whether the vehicle has traveled above a predetermined distance while the vehicle is in a forward drive mode; and
   receiving second information indicative of a second distance between the object and the vehicle.

9. The method of claim 8 further comprising deactivating alerts in connection with a reverse park aid (RPA) system in response to determining that the first distance between the object and the vehicle has not decreased while the vehicle is in reverse.

10. The method of claim 8 further comprising deactivating alerts in connection with a reverse park aid (RPA) system in the event the second distance is generally similar to the first distance and the vehicle has traveled above the predetermined distance while the vehicle is in the forward drive mode.

11. The method of claim 10 further comprising determining whether the vehicle has been stationary for a predetermined amount of time after deactivating the alerts.

12. The method of claim 11 further comprising third information indicative of a third distance between the object and the vehicle after the vehicle has been stationary for the predetermined amount of time.

13. The method of claim 12 comprising:
   determining whether the third distance is generally similar to the first distance; and
   deactivating alerts in connection with the RPA system if the third distance is generally similar to the first distance.

14. The method of claim 8 further comprising activating alerts in connection with a reverse park aid (RPA) system in response to determining that the first distance between the object and the vehicle has decreased while the vehicle is in reverse.

15. An apparatus comprising:
   a controller configured to:
      detect an object positioned rearward of a vehicle;
      receive information indicative of a first distance between the object and the vehicle;
      receive a signal indicative of the vehicle traveling in reverse;
      determine whether the first distance is decreasing based on the signal; and
      determine that the object is a trailer if the first distance between the object and the vehicle has not decreased while the vehicle is in reverse;
      determine whether the vehicle has traveled above a predetermined distance while the vehicle is in a forward drive mode; and
      receive first information indicative of a second distance between the object and the vehicle.

16. The apparatus of claim 15 wherein the controller is further configured to deactivate alerts in connection with a reverse park aid (RPA) system in response to determining that the distance between the object and the vehicle has not decreased while the vehicle is in reverse.

17. The apparatus of claim 15 wherein the controller is further configured to deactivate alerts in connection with a reverse park aid (RPA) system in the event the second distance is generally similar to the first distance and the vehicle has traveled above the predetermined distance while the vehicle is in the forward drive mode.

18. An apparatus comprising:
   a controller configured to:
      detect an object positioned rearward of a vehicle;
      determine a first distance between the object and the vehicle when the vehicle is in reverse;
      determine a second distance between the object and the vehicle when the vehicle has traveled above a predetermined distance while in a forward drive mode; and
      disable alerts in a reverse park aid system if the first distance is equal to the second distance.

* * * * *